Aug. 15, 1967  V. T. BUEHLER  3,335,703

PAINT MASKING SHIELD

Filed July 20, 1965  5 Sheets-Sheet 1

INVENTOR.
VERNE T. BUEHLER
BY
ATTORNEY

INVENTOR
VERNE T. BUEHLER

Aug. 15, 1967 V. T. BUEHLER 3,335,703
PAINT MASKING SHIELD

Filed July 20, 1965 5 Sheets-Sheet 3

INVENTOR
VERNE T. BUEHLER
BY *Ross W. Campbell*
ATTORNEY

Aug. 15, 1967  V. T. BUEHLER  3,335,703

PAINT MASKING SHIELD

Filed July 20, 1965  5 Sheets-Sheet 4

INVENTOR
VERNE T BUEHLER
BY *Ross W. Campbell*
ATTORNEY

Aug. 15, 1967 V. T. BUEHLER 3,335,703

PAINT MASKING SHIELD

Filed July 20, 1965 5 Sheets-Sheet 5

INVENTORS
VERNE T. BUEHLER

BY *Ross W. Campbell*

ATTORNEY

United States Patent Office 3,335,703
Patented Aug. 15, 1967

3,335,703
PAINT MASKING SHIELD
Verne T. Buehler, 158 Ferndale,
Rochester, Mich. 48063
Filed July 20, 1965, Ser. No. 475,319
4 Claims. (Cl. 118—504)

This application is a continuation-in-part of application Ser. No. 429,746, filed Feb. 2, 1965, now abandoned.

The present invention relates to masking shields and more particularly to masking shields for preventing paint from contacting portions of a surface immediately adjacent to an area to be painted.

An object of the invention is to provide an improved paint masking shield for protecting from paint a portion of a surface immediately adjacent to an area to be painted.

Another object of the invention is to provide improved means for establishing a precise margin for freshly applied paint.

A further object of the invention is to provide means for removing a paint masking shield from contact with a margin of freshly applied paint without smearing the margin.

The above and other objects of the invention which will later become apparent as the following description proceeds, are attained by the present invention, preferred embodiments of which have been illustrated, by way of example only, in the accompanying drawings, forming a part of this specification, in which like characters are employed to designate like parts throughout the same, and wherein.

Figure 1:
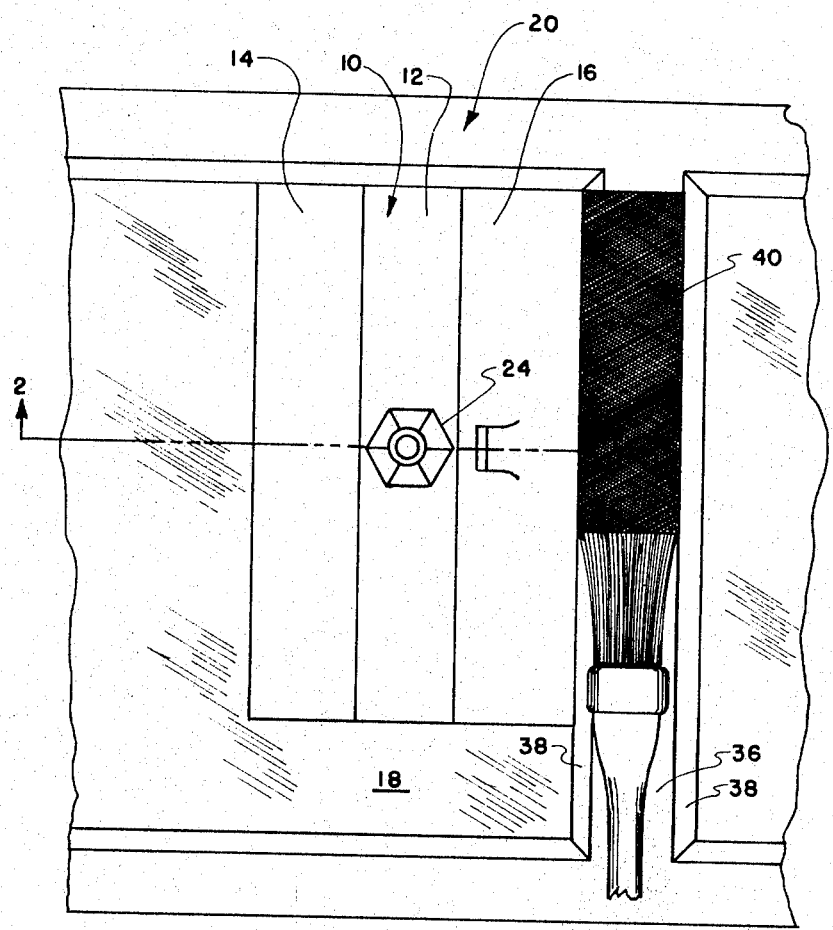
FIGURE 1 is a plan view of an improved paint masking shield embodying my invention and illustrating the employment thereof.

Referring now more particularly to the drawings, I provide in the preferred embodiment of my invention shown in FIGURES 1 through 7, inclusive a generally concavo-convex body 10, formed of resilient plastic or similar material, and having an elongated web 12 and a pair of elongated, downwardly inclined wings 14 and 16 extending transversely therefrom. Wings 14 and 16 are preferably of equal width and downwardly inclined at equal angles from web 12, so that the web will be disposed in a spaced, parallel arrangement with any surface, such as the glass pane 18 of a window sash 20, when body 10 is placed thereagainst.

Surface gripping means such as a suction cup 22 is connected to the underside of web 12, and a handle 24 is connected to the upper side of the web, by conventional means such as a threaded, double ended stud 26. The crown 28 of suction cup 22 is selected to have such a length that, when the lower edge 30 of the cup is engaged with a surface, the outer edges of wings 14 and 16 contact such surface and are slightly tensioned thereagainst by the resiliency of body 10.

Figure 5:
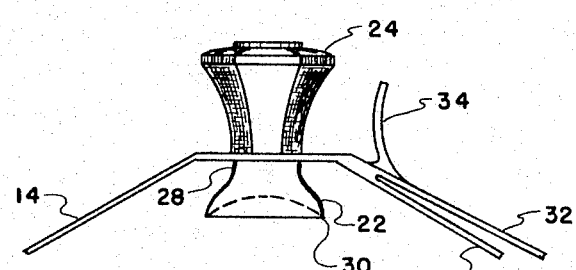
FIGURE 5 is an end view of the preferred embodiment of my invention disengaged from any surface.

I provide an apron 32, composed of the same resilient material as body 10 and integral with or joined to the body and extending laterally therefrom near the juncture of web 12 and wing 16. Apron 32 is of slightly greater width than wing 16 and is downwardly inclined at a slightly lesser angle to web 12 so that, when the device is not engaged with any surface, the outer edge of the apron is substantially co-planar with the outer edges of wings 14 and 16, as best shown in FIGURE 5. The resilient nature of the material from which body 10 and apron 32 are formed, together with the integral connection of the apron with the body, tension the apron to yieldingly retain this position. Apron 32 is equal to or slightly greater in length than wings 14 and 16, and is provided with a thumb lever 34 formed by a projection which extends upwardly from the apron and disposed for engagement by the thumb of a hand which grasps handle 24. When, however, thumb lever 34 is pressed inwardly, toward handle 24, apron 32 is thereby levered upward, about its junction with body 10 as a hinge, so that the outer edge of the apron is elevated above the plane of the outer edges of wings 14 and 16.

Figure 2:
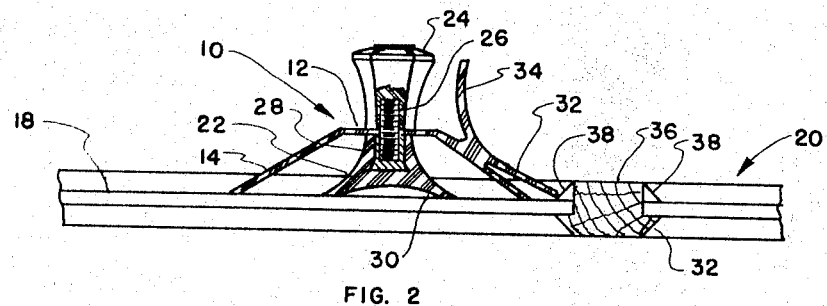
FIGURE 2 is a transverse sectional view taken on line 2—2 of FIGURE 1.
Figure 3:
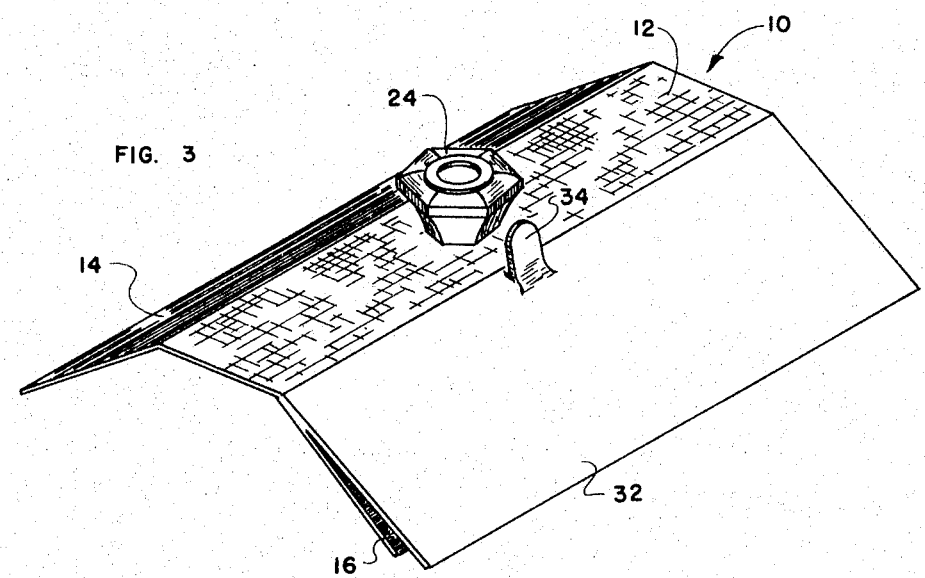
FIGURE 3 is a perspective view from above of the preferred embodiment of my invention.
Figure 4:
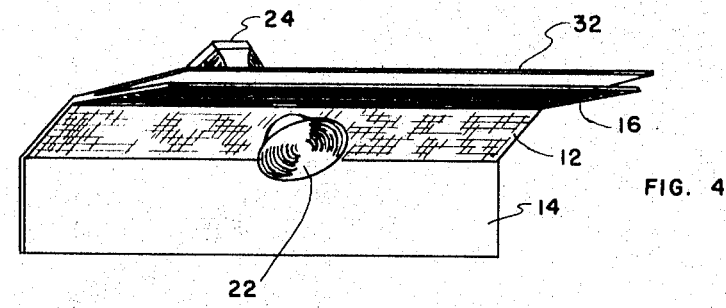
FIGURE 4 is a perspective view from below of the preferred embodiment of my invention.

When it is desired to shield a portion of a surface to be painted and to establish a precise margin for the paint, the device is placed over the portion to be protected, such as pane 18, adjacent to the area to be painted, such as mullion 36 and putty 38 of sash 20, and pressed downwardly until suction cup 22 firmly engages the surface. Wings 14 and 16, and apron 32, are thereby forced slightly outwardly with respect to web 10 and are tensioned against the surface by the resiliency of body 10 and apron 32 as the device is engaged with the surface. When, as is best shown in FIGURES 1 and 2, paint is applied adjacent to the device, apron 32 constitutes a barrier preventing any of the paint from contacting the portion of pane 18 which lies therebelow, and the outer edge of the apron provides a sharp margin for the paint between the painted and unpainted areas.

Figure 6:
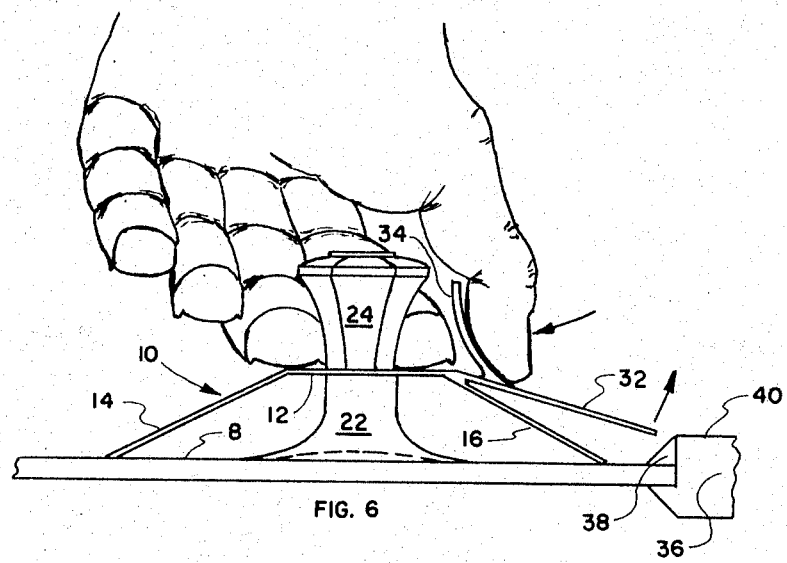
FIGURE 6 is an end view of the preferred embodiment of my invention prepared to be disengaged from a surface.
Figure 7:
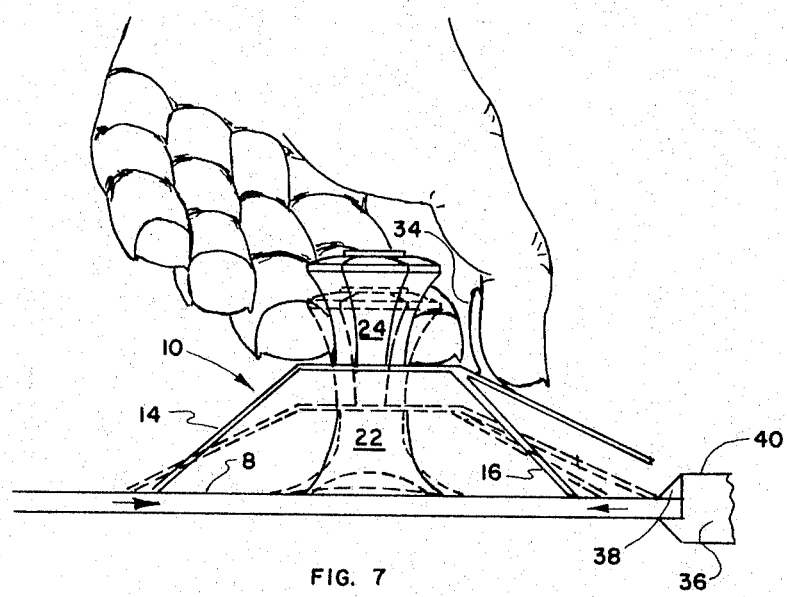
FIGURE 7 is an end view of the preferred embodiment of my invention in process of disengagement from a surface.

When the painting has been completed, handle 24 is gripped manually in the manner best shown in FIGURES 6 and 7, with the thumb engaging thumb lever 34. Thumb lever 34 is then pressed inwardly by the thumb, in the direction of handle 24, whereby apron 32 swings upward about its junction with body 10 as a hinge, causing the outer edge of the apron to be elevated and to break contact with the margin of painted area 40 by such upward movement. With apron 32 retained in its elevated position and thus spaced from painted area 40, the device is disengaged from pane 18 by upward movement of handle 24. As the device is thus disengaged, wings 14 and 16 move slightly inwardly to assume their position of rest, as illustrated by the arrows in FIGURE 7, but the lower edge of apron 32, along which some paint will still adhere as a result of its former contact with the margin of painted area 40, remains above and spaced from contact with the pane. The device is thus disengaged from the surface which has been painted without the slightest smearing of the margin between the painted and unpainted areas and without any paint reaching the protected area.

Figure 8:
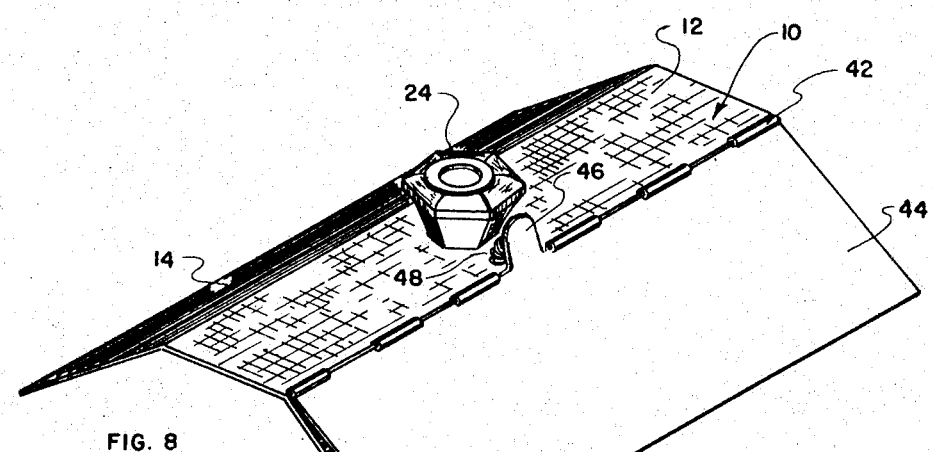
FIGURE 8 is a perspective view of a first modified form of my invention.

In a first modified form of my invention shown in FIGURE 8, I employ a hinge, such as piano hinge 42, to hingeably connect an apron 44 to body 10. Apron 44 bears an upwardly extending thumb lever 46, and a compression spring 48 yieldingly urges the thumb lever away from web 12, and hence apron 44 to swing downwardly about hinge 42 in the direction of wing 16.

Figure 9:
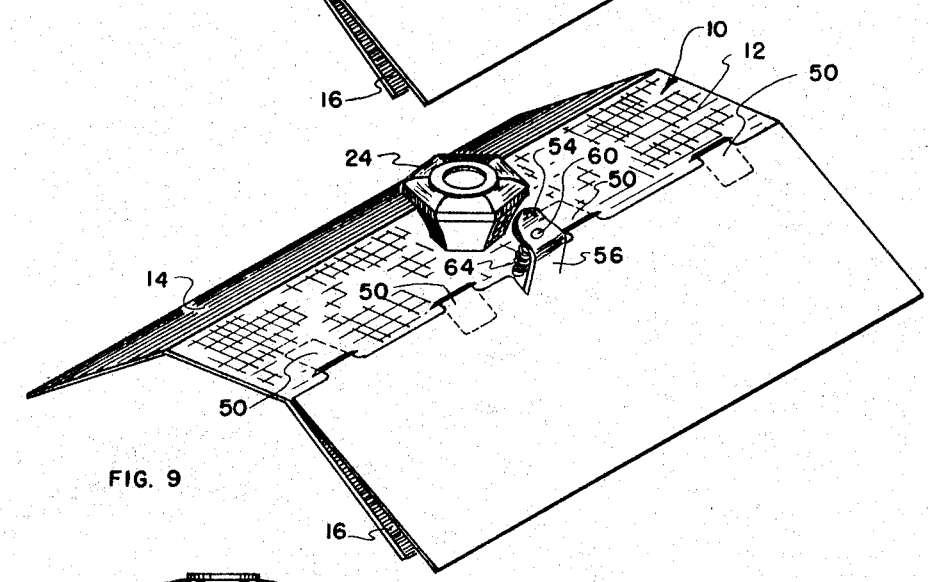
FIGURE 9 is a perspective view of a second modified form of my invention.
Figure 10:
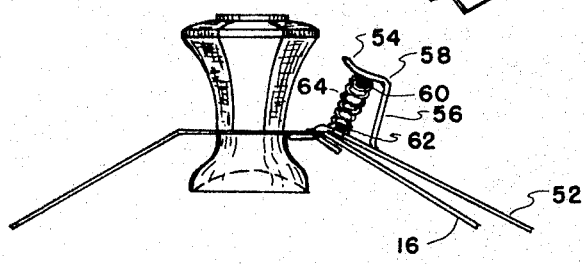
FIGURE 10 is an end view of the second modified form of my invention.

In a second modified form of my invention, best shown in FIGURES 9 and 10, I employ an alternating tongue and slot hinge 50 to hingeably join an apron 52 to body 10, and I provide a thumb lever 54 which has an inverted L-shaped intermediate portion 56. The foot 58 of intermediate portion 56 is punched to form a downwardly directed projection 60, and wing 16 is punched to form an upwardly directed projection 62 in substantial alignment with projection 60, to engage, respectively, the two ends, and thereby retain, a coiled compression spring 64.

The operation of the first and second modified forms of my invention is similar to that of the preferred embodiment. It will be noted, however, that aprons 44 and 52 will normally rest against wing 16 under urging from springs 48 and 64, respectively, and with their respective outer edges extending outwardly beyond and below the outer edges of the wing, when the devices are not engaged with a surface.

Figure 11:
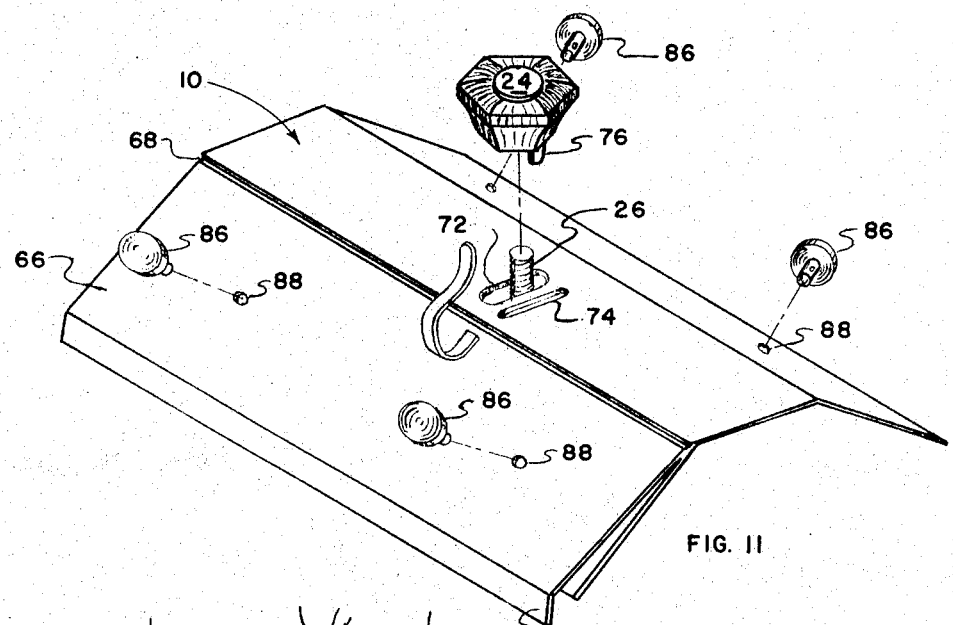
FIGURE 11 is an exploded view of a third modified form of my invention.
Figure 13:
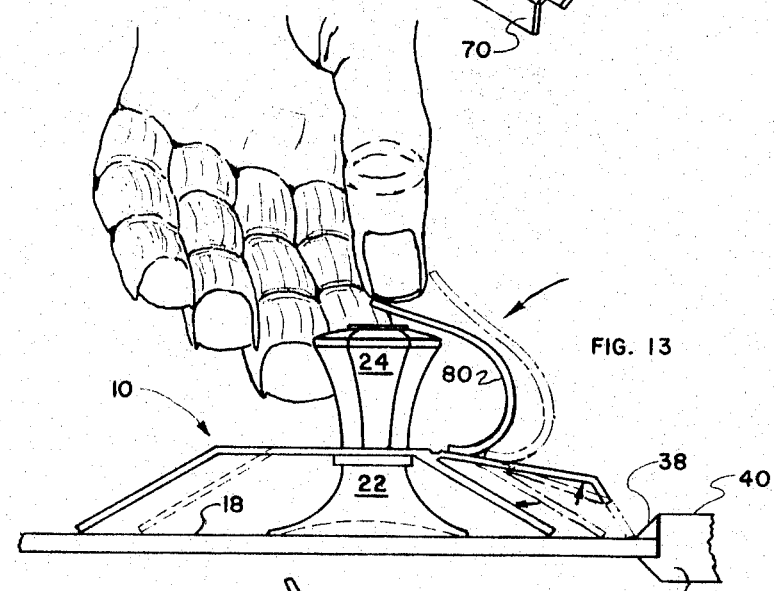
FIGURE 13 is an end view of the third modified form of my invention in process of disengagement from a surface.
Figure 12:
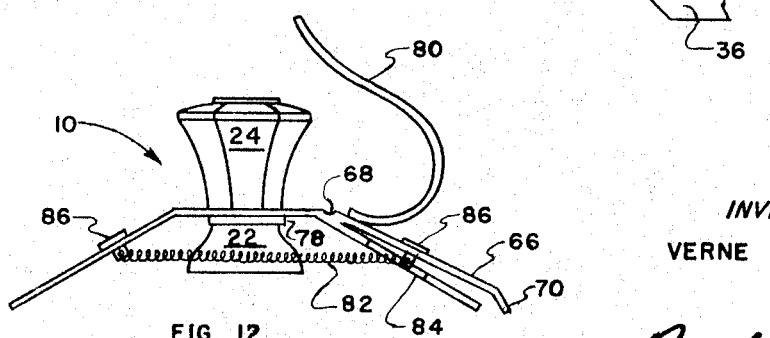
FIGURE 12 is an end view of the third modified form of my invention.

In a third modified form of my invention, best shown in FIGURES 11, 12, and 13, I form body 10, formed simultaneously by extrusion of polypropylene plastic material a body 10, an apron 66, and an integral hinge 68 joining the body and hinge. Apron 66 is preferably provided with a downturned outer edge 70. A first slot 72 is punched in web 12, extends transversely from a point slightly beyond the centerline of the web to a point near hinge 68, to receive and slidingly guide stud 26 from the midpoint of the web to a point near the hinge. A second slot 74 is also punched into web 12 parallel and slightly spaced from slot 72. A small key or projection 76 is formed or embedded in the underside of handle 24 and positioned to extend downwardly and slide within slot 74 when the handle is engaged with stud 26. A washer 78 is provided surrounding stud 26 between suction cup 22 and the underside of web 12. An upwardly-curved plastic handle 80 is affixed to apron 66 by conventional means, such as by heat tacking, and extends upwardly to a point above handle 24.

One or more coiled springs 82 extend, respectively, through an aperture 84 in wing 16 and are connected at their opposite ends to wing 14 and apron 66 by transversely perforated rivets 86 extending through apertures 88 therein. It will be noted that, when assembled, handle 24, stud 26, washer 78 and suction cup 22 are permitted by slot 72 to slide transversely with respect to body 10 for a distance of approximately half the width of the web, and that key 76 is slidingly engaged within slot 74.

In the operation of this third modified form of my invention, handle 24 is manually brought to the inner end of slot 72, thereby positioning the handle and suction cup 22 at the middle of web 12, prior to pressing the device against and thus engaging it with the article to be painted. When the painting of the adjacent, unprotected area is completed, the painter presses downwardly and inwardly upon handle 80. Such downward and inward pressure upon handle 80 not only elevates apron 66 about hinge 68 in the same manner as hereinbefore described with respect to the preferred, first modified, and second modified forms of the invention, but also simultaneously moves body 10, the apron, and handle away from the point margin; while suction cup 22 remains affixed to the protected surface, slot 72 permits web 12 to slide transversely with respect to stud 26, handle 24, and the suction cup for this purpose. Thus not only is apron 66 separated vertically from the margin of the freshly applied paint but both the apron and wing 16 nearest the apron are moved horizontally away from the margin to further separate them therefrom.

Downward movement of handle 80 is limited by contact with handle 24, thus preventing excessive elevation of apron 66 or excessive stretching of springs 82 and consequent damage to the device. It will also be noted that key 76, which slides within slot 74 as stud 26 slides transversely within slot 72, prevents relative rotation between handle 24 and web 12 so that the web is not subjected to either binding or excessive slack in its sliding engagement with the stud.

With apron 66 thus retained in its elevated position, and with body 10 and the apron thus translated away from the margin of the fresh paint, the device is disengaged from the protected surface by upward movement of handle 24 in the same manner as hereinbefore described with respect to the preferred, first modified, and second modified forms of the invention.

While I have shown and described body 10 of my invention as being formed of resilient material and having an inverted channel-shaped cross-section, it is obvious that it may be formed of non-resilient material and with a semi-circular or other cross-section. Further, while I have shown and described the aprons of the several forms of my invention as being constructed of resilient material and as having their outer edges formed straight and parallel to the edge of wing 16, it is obvious that they may be formed of non-resilient material and with non-linear outer edges of any desired length.

It is to be understood that the forms of the invention herewith shown and described are to be taken as preferred embodiments of the same and that resort may be had to various changes in construction without departing from the scope of the subjoined claims.

What is claimed is:

1. In combination with a paint masking shield having a handle and a body, said body including a pair of downwardly inclined wings which extend down from generally opposite sides of said body, the improvement comprising, an apron connected to said body and extending laterally outward beyond the lower edge of one of said wings and resiliently downwardly to at least substantially the plane of the lower edges of said wings, a thumb lever extending upwardly from said apron and adapted to elevate the outer edge of said apron, and surface gripping means connected to the underside of said body.

2. In combination with a paint masking shield having a handle and a body, said body including a pair of downwardly inclined wings which extend down from generally opposite sides of said body, the improvement comprising, an apron connected to said body by a hinge and extending laterally outward beyond the lower edge of one of said wings, a spring yieldingly urging said apron downwardly about said hinge and to extend downwardly to at least substantially the plane of the lower edges of said wings, and a thumb lever extending upwardly from said apron and adapted to rotate said apron upwardly about said hinge and to elevate the outer edge of said apron above the plane of said lower edges of said wings in opposition to said spring, and surface gripping means connected to the underside of said body.

3. In combination with a paint masking shield having a handle and a body, said body including a pair of downwardly inclined wings which extend down from generally opposite sides of said body, the improvement comprising, an apron connected by a hinge to said body and extending laterally outwardly beyond the lower edge of one of said wings, a thumb lever extending upwardly from said apron and having an inverted L-shaped intermediate portion, a coiled compression spring retained between said thumb lever and said body by a first projection extending downwardly into the upper end of said spring from the foot of said L-shaped intermediate portion and by a second projection extending upwardly into the lower end of said spring from said body, said spring yieldingly urging said apron downwardly about said hinge and to extend downwardly to at least substantially the plane of the lower edges of said wings, said thumb lever being adapted to rotate said apron upwardly about said hinge and to elevate the outer edge of said apron above the plane of said lower edges of said wings in opposition to said spring, and surface gripping means connected to the underside of said body.

4. A paint masking shield comprising, an elongated web, a pair of resilient wings extending downwardly from opposite sides of said web, an apron extending laterally outward beyond the lower edge of one of said wings and yieldingly urged to extend downward to at least substantially the plane of the lower edges of said wings, a transverse slot in said web, a handle above said web, surface gripping means below said web, and connecting means extending upwardly through and transversely slideable within said slot and interconnecting said handle and gripping means, and a lever extending upwardly from said apron and adapted to elevate the lower edge of said apron above said plane and to translate said slot, web, wings, and apron with respect to said connecting means, handle, and surface gripping means when said lever is moved in the direction of said handle.

References Cited

UNITED STATES PATENTS

| | | | |
|---|---|---|---|
| 624,796 | 5/1899 | Hardin | 118—504 |
| 1,001,532 | 8/1911 | Kenyon et al. | 118—504 |
| 1,386,706 | 8/1921 | Hall | 118—504 |
| 1,411,462 | 4/1922 | Wendt | 118—504 |
| 1,491,693 | 4/1924 | Graham | 118—504 |
| 2,098,005 | 11/1937 | Holt | 118—504 |
| 2,126,501 | 8/1938 | Puderbaugh | 118—505 |
| 2,212,073 | 8/1940 | Orth | 118—504 |
| 2,289,136 | 7/1942 | Matter | 118—504 |
| 2,672,122 | 3/1954 | Kupec et al. | 118—504 X |

FOREIGN PATENTS

| | | |
|---|---|---|
| 18,938 | of 1914 | Great Britain. |
| 581,704 | 10/1946 | Great Briain. |
| 724,696 | 2/1935 | Great Britain. |
| 911,553 | 11/1962 | Great Britain. |

MORRIS KAPLAN, *Primary Examiner.*